United States Patent [19]

Björkengren et al.

[11] Patent Number: 4,733,800
[45] Date of Patent: Mar. 29, 1988

[54] TUBE AND A METHOD AND A DEVICE FOR MANUFACTURING OF THE TUBE

[75] Inventors: Carl-Axel Björkengren, Åkarp; Lennart Månsson, Lund, both of Sweden

[73] Assignee: AB Akerlund & Rausing, Sweden

[21] Appl. No.: 777,634

[22] Filed: Sep. 19, 1985

[30] Foreign Application Priority Data

Oct. 2, 1984 [SE] Sweden .................. 8404921

[51] Int. Cl.⁴ .................. B65D 35/08; F16L 00/00
[52] U.S. Cl. .................. 222/107; 138/138; 156/203; 428/36
[58] Field of Search .................. 222/92, 101, 106; 428/35, 36, 461; 156/203, 218; 138/138

[56] References Cited

U.S. PATENT DOCUMENTS

| | | | |
|---|---|---|---|
| 1,188,115 | 6/1916 | Thompson, Jr. | 222/107 |
| 2,176,109 | 10/1939 | Ratay | 138/138 X |
| 2,287,259 | 6/1942 | Lindstrom | 222/107 |
| 2,401,784 | 6/1946 | Zahara | 222/107 |
| 2,430,046 | 11/1947 | Dreyfus | 222/107 |
| 2,605,018 | 7/1952 | Croce et al. | 222/107 |
| 3,211,342 | 10/1965 | Miles | 222/107 |
| 3,347,419 | 10/1967 | Brandt et al. | 222/107 |
| 3,976,224 | 8/1976 | Ericson et al. | 222/107 |
| 4,196,825 | 4/1980 | Kincaid | 222/107 |
| 4,539,259 | 9/1985 | Zuscik | 428/461 X |

FOREIGN PATENT DOCUMENTS

| | | | |
|---|---|---|---|
| 40782 | 10/1932 | France | 222/107 |
| 110848 | 5/1961 | Pakistan | 222/107 |

Primary Examiner—Joseph J. Rolla
Assistant Examiner—Gregory L. Huson
Attorney, Agent, or Firm—Lerner, David, Littenberg, Krumholz & Mentlik

[57] ABSTRACT

A packaging tube including a body formed from a laminate containing a metal foil and a plastic layer is provided with a strip also formed from a laminate incorporating a metal foil and a plastic film. The metal foil in the strip is thicker than the metal foil in the body laminate. The strip provides dead-fold characteristics. The strip may extend along a joint, such as a butt joint, in the tube body so that the strip covers the joint.

14 Claims, 8 Drawing Figures

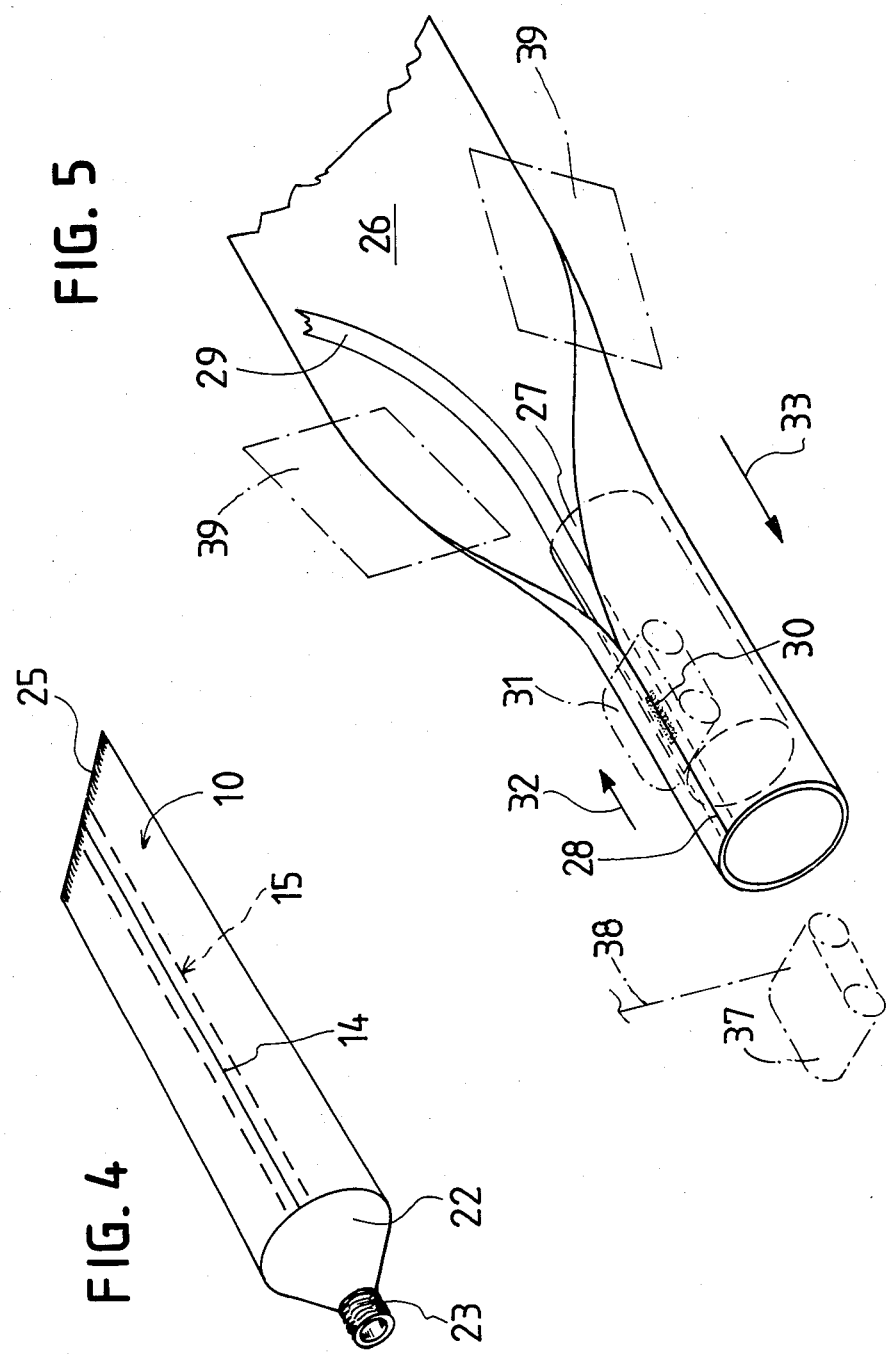

TUBE AND A METHOD AND A DEVICE FOR MANUFACTURING OF THE TUBE

BACKGROUND OF THE INVENTION

The present invention relates to a packaging tube, more precisely a tube of the laminate tube type. The invention relates also to a method and a device for manufacturing of the actual tube.

The term laminate tube means a tube manufactured from a laminate comprising metal foil, usually aluminium foil. Laminate tubes are well known. As time has passed by laminate materials as well as the manufacturing technique have been developed.

The market has shown a very high degree of acceptance and people within the art have realized that the laminate technique offers an alternative to metal tubes and that such alternative is an interesting one for several reasons, not at least from a cost point of view when packaging products requiring sofisticated barrier properties of the packaging tube.

A frequently occuring problem, has to do with the provision of handling characteristics which would be acceptable.

The consumer wants to roll up the tube as it is being emptied, and he/she prefers a "dead" material in such cases, i.e. a material without a tendency of returning or without "a mechanical memory". The term used within the actual technical field is a material having pronounced dead-fold characteristics. The term dead-fold falls under a broader term called "resilience" and frequently used when defining the overall characteristics of a metal foil containing laminate.

Briefly the problem may be identified by recognizing the fact that a laminate tube is more like an all-plastics tube than a metal tube (for instance lead or zinc tube), unless specific measures are taken.

The return tendency the laminate tube has, without such measures, for instance means that the contents of the tube will be exposed to a large volume of air when the tube returns to its original shape although the contents of the tube has decreased drastically.

THE STATE OF THE ART

So far the unfavourable return tendency of the metal foil laminate has been dealt with by applying either one of three basic methods.

According to a first method, described in U.S. Pat. No. 3 976 224, there is required a large amount of metal in the tube body. Double metal foils, one at each side of a centre polymer layer, are used for a laminate having additional layers of plastic and binder.

Having in mind that the contents of metal, generally aluminium, is the impact factor from a cost point of view, this increased cost means a large drawback for a mass product of the present type, without any real inherent value.

According to a second method, an older one described in U.S. Pat. No. 3 505 143 or a younger in EP No. 0 115 111, paper in combination with a multilayer laminate, comprising i.a. metal and polymer, forms the basis for form stability and dead-fold. This tube structure means a high cost of material and a complex and expensive manufacturing method.

The third method, which is described in EP No. 0 084 922, makes use of a polymer layer having an organic additive as a filler. The layer having such filler forms the element providing dead-fold by forming grooves or other weakening lines in the layer for counter-acting a return tendency. From a barrier point of view this method involves a dangerous working of the material of the outer layer protecting the metal foil. There is a risk for damage of the metal foil. Additionally, the possibility of the important step of printing the tube will be negatively affected.

OBJECTS OF THE INVENTION

Thus, there is a need to provide an alternative to the known technique of giving laminate tubes dead-fold characteristics.

The alternative which is aimed at should be in-line with well established tube handling methods, but eliminate cost increasing addition of material.

SUMMARY OF THE INVENTION

Having this in mind the invention therefore provides, in the broadest sense thereof, a packaging tube, comprising a body of a metal foil containing laminate, a tube breast having an discharge opening at one end of the body, and an elongated element attached to the tube body and extending generally along the entire length thereof.

The tube is characterized in that the elongated element comprises a strip having dead-fold characteristics manufactured from a metal foil containing material, and that the thickness of the metal foil of the tube body falls within the interval 5 to 40 microns, and is selected such that the metal foil of the body is considerably thinner than the thickness of the metal foil of the strip which falls within the interval 40 to 200 microns.

The thickness relation preferably is such that a foil thickness of the tube body of for instance 5 microns corresponds to a strip thickness of 200 microns, i.e. a certain thickness taken from the lower region of the tube body interval corresponds to a certain thickness taken from the upper region of the strip interval.

In the basic embodiment the strip is arranged on the inside of the tube body and has such a width that on both sides of a longitudinal tube body joint there is formed a barrier against penetration into the longitudinal joint of substances of the filling goods having delaminating characteristics.

As the heat sealing method is the most preferable method for longitudinal sealing of tubes, the side of the strip facing the inside of the tube body is provided with a layer of a polyolefine plastics of a type being heat sealing compatible with the inside of the tube body.

In order to avoid exposure of the metal foil edges to the contents of the tube, if necessary, the strip has a plastics layer of an over-dimensioned thickness before attaching the strip, such that the excess amount of plastics will "flow out" and cover the edges of the strip after it has been sealed by heat sealing.

In order to protect the longitudinal joint there may also be arranged an external strip over the longitudinal joint.

In order to adapt the strip to the tube body the plastics layer of the strip preferably is over-dimensioned and arranged such that it covers the edges of the strip after it has been heat sealed.

In a preferred embodiment the laminate of the tube body is arranged edge against edge.

In one embodiment the metal foil containing tube body and the dead-fold strip are attached to an all-metal breast, for instance of aluminium.

For making the tube stackable the tube body may be made conical.

In one embodiment the tube body is made from a trapezoid blank.

The invention also provides a method for manufacturing of a packaging tube, comprising a body of a metal foil containing laminate and a tube breast having a discharge opening at one end of the body, and an elongated element attached to the tube body such that it extends in the longitudinal direction of the body and generally along the entire length thereof.

The method is characterized in that the elongated element is selected such that it comprises a strip of a metal foil containing material having dead-fold characteristics with a metal foil thickness in the interval 40 to 200 microns and selected such that the metal foil of the strip is considerably thicker than the metal foil of the tube body which faces within the interval 5 to 40 microns.

A web of a metal foil containing laminate is formed into tube-shape on a mandrel, a strip of metal foil containing laminate is placed over the longitudinal joint that is obtained and is heat sealed against the tube-shaped body.

The relation between the two metal foil intervals preferably is such that a certain thickness taken from the lower region of the tube body interval corresponds to a certain thickness taken from the upper region of the strip interval, i.e. a five microns foil for the tube body for instance corresponds to the upper extreme value of the 40 to 200 microns interval, i.e. 200 microns.

In the basic embodiment the strip is placed inside the tube body by guiding it in a groove in a mandrel arranged to place the strip in register with the longitudinal joint of the tube body that is obtained.

The heat sealing preferably is accomplished by high frequency welding, for instance induction welding, by arranging a magnetic field producing member for directing the field against the region of the longitudinal joint, and by arranging a member for providing a sealing pressure along the joint.

Another method of heat sealing comprises ultrasound welding.

The necessary cooling of the welding region is obtained by providing the mandrel with channels for a cooling medium for cooling the welding region.

The plastics for protecting the edges of the metal foil preferably is obtained by arranging the mandrel with outflow zones for receiving the plastics to cover the metal foil edges.

In order to avoid an undesired mechanical strain in the welding region the member for providing the sealing pressure preferably is formed as an endless belt which is given generally the same speed as the speed at which the tube-shaped body is transported over the mandrel.

The invention also provides a device for manufacturing a packaging tube comprising a body of a metal foil containing laminate and a tube breast having a discharge opening at one end of the body.

The device is characterized by a mandrel device having a longitudinal recess therein for guiding a metal foil containing laminate strip, by means for forming a web of a metal foil containing laminate into tube-shape, and by means for heat sealing the strip to the inside of the web in register with the longitudinal joint obtained in the web.

In the preferred embodiment said means for heat sealing preferably comprises a high frequency welding device, for instance an induction welding device, and an endless belt for providing a sealing pressure.

For obtaining an optimum temperature distribution there are preferably also formed channels for a cooling medium in the mandrel.

BRIEF DESCRIPTION OF THE DRAWINGS

FIG. 5 is a basic diagram showing a preferred method of manufacturing the tube according to the invention.

DESCRIPTION OF PREFERRED EMBODIMENTS

Figure 1:
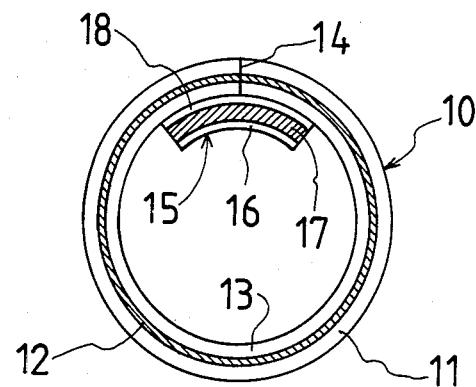
FIG. 1 in a cross section shows a tube body according to a first embodiment of the invention.

The reference numeral 10 in FIG. 1 relates to a laminate tube comprising three layers 11, 12 and 13. The intermediate layer 12 is a metal foil layer forming a gas and vapor barrier, usually of aluminium, having a thickness in the interval 5 to 40 microns. On this layer there are attached, if necessary by use of primer or other auxiliary means, polyolefine layers 11, 13, usually layers of polyethylene or polypropylene, having a thickness of typically 10 to 50 microns. The layers 11, 13 may be obtained as a coating or a film.

The laminate comprising said layers, which of course may be supplemented by additional layers, is formed into a generally cylindrical shape having the edges thereof placed edge against edge for forming a longitudinal joint 14. On the inside of the tube body this joint is covered by a strip 15. The strip 15 also comprises three layers 16, 17 and 18. The intermediate layer 17 is a metal foil layer, usually of aluminium, having a thickness in the interval 40 to 200 microns, thus a thickness considerably thicker than the thickness of the metal foil layer 11 of the tube body.

A certain thickness taken from the upper region of a strip interval 40 to 200 microns, for instance 200 microns, corresponds to a certain thickness taken from the lower region of the tube interval 5 to 40 microns, in the actual case 5 microns. Thus, in reality there is a substantial difference between the thickness of the metal foils in the tube body and the strip, respectively.

The layers 16 and 18 are polyolefine layers selected by taking into consideration the heat sealing characteristics against the polyolefine layer 13 of the tube body. The thicknesses of the layers 16, 18 may for instance fall in the interval 10 to 50 microns. The layers may be applied as a coating or as a film.

The thickness relation between the foil 17 and the foil 12 implies most interesting handling characteristics of the entire structure, i.e. the tube body 10 and the strip 15. It has been found that the strip provides the "deadfold" aimed at for the tube body which per se has a return tendency to the original shape. Additionally, this is achieved by a total contents of metal in the tube considerably less than the metal contents of known laminate tubes having dead-fold characteristics.

Although the thickness of the layer 17 of the strip 5 may be a considerable thickness in relation to the thickness of the layer 13, the strip has a very limited width, of the order around 10 per cent or less of the tube body circumference, which means that the total metal contents of the tube body and the strip will be very advantagous, especially as the thickness of the metal foil 12 of the tube body may be reduced. Basically one has only to consider the function thereof as a gas and vapor barrier. The width of the strip may also be minimized and you have merely to see to it that the width is such that there is formed on both sides of the longitudinal joint a barrier against penetration into the longitudinal joint of substances of the filling goods having delaminating characteristics.

Figure 2:
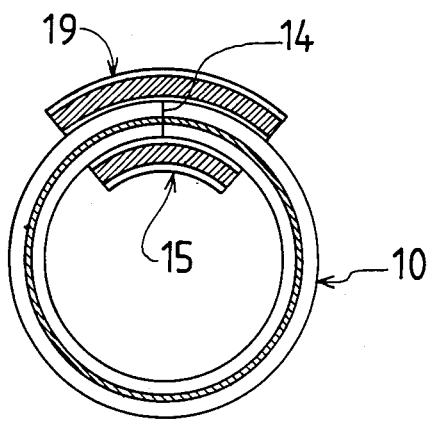
FIG. 2 shows a tube body according to another embodiment.
Figure 3:
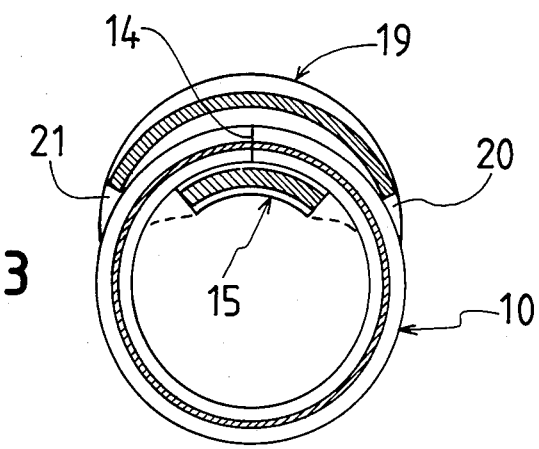
FIG. 3 shows the embodiment in FIG. 2 in a somewhat modified version, FIG. 4 in a perspective view shows the tube having a strip at the inside thereof.

In FIG. 2 there is shown another embodiment of the invention, where a strip 19 is arranged on the outside of the tube along the joint 14. This outside strip protects against repeated folding or pressing together of the tube body around a line coinciding with the longitudinal joint 14. By using the double strip structure in FIG. 1 it is also possible to reduce the metal thickness of the actual strip. As shown in FIG. 3, it is also possible to obtain a proper and smooth transition between the strip 19 and the tube body 10.

In order to accomplish this, one has to see to it that the external layer on the strip 19 is somewhat over-dimensioned such that there are formed transition regions 20, 21 of excess plastics material after the plastics has flown out when heat sealing the strip.

Such a method may also be applied to the inside strip 15, if a metal edge contact is not desirable in specific applications, for instance when the tube contents is toothpaste in spite of the fact that such an edge or edges form a very limited contact surface. The unfavourable risk of metal contact at the joint 14, for instance unfavourable in view of delamination risk, has already been eliminated by means of the strip 15.

In FIG. 4 there is shown in a perspective view a complete laminate tube according to the invention comprising a tube body 10, a breast 22 and a discharge opening 23. The conventional type of cross sealing 25 is arranged perpendicular to a plane housing the joint 14. When the tube is handled in the normal way the longitudinal joint 14 will not be "broken up", instead the inner strip 15 forms a stiffening support for the forces acting when the tube is pressed together when discharging the contents.

In FIG. 5 it is shown how a laminate web, intended for tube bodies 10, is folded by means of a pair of folding rails 39 into a cylindrical shape over a mandrel 27 and placed over this mandrel such that a longitudinal joint 28 having the edges of the laminate placed edge against edge is obtained. The laminate 26 is of the basic structure described in connection with the tube body 10 in FIG. 1.

A further laminate strip 29, in the shape of a narrow ribbon, having the structure described with reference to FIG. 1, is fed against and along the mandrel 27 in register with the joint 28.

A high frequency welding device, for instance an induction welding device 30 is arranged over the mandrel 27 and the joint 28 and directs the magnetic field thereof against the welding region, i.e. the joint 28 and the strip 29 below the joint. The necessary heating for softening of the thermoplastics material is obtained by induction in the metal foil of the strip 15.

In order to obtain the necessary pressure in the welding region a sealing pressure device in the shape of an endless belt 31 is arranged. The belt is oriented in register with the joint 28 and the direction of movement appears from the arrow 32. The speed of movement of the belt generally corresponds to the speed the web 26 is formed into a tube on the mandrel 27 when the web 26 is forwarded in the direction of the arrow 33.

Figure 6:
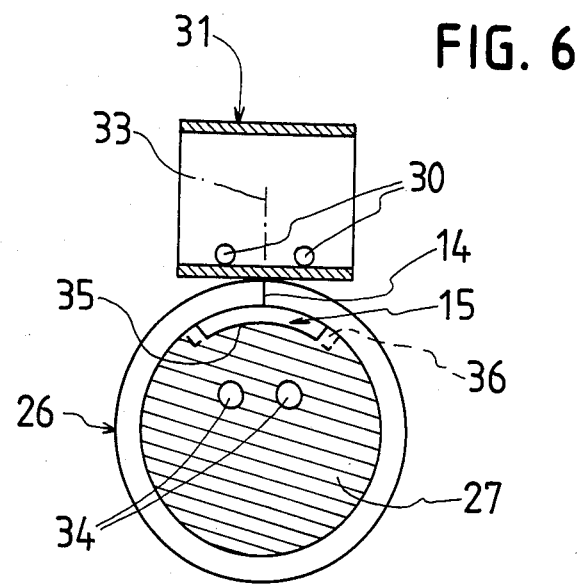
FIG. 6 is a schematic section through the tube mandrel and the positioning and sealing pressure device in FIG. 5, FIG. 7 in a cross section shows a tube breast of metal, for instance aluminium, and FIG. 8 in a plan view shows a blank for a conical tube.

In FIG. 6 there is shown a section through the mandrel 27 and the welding and sealing pressure device. The welding device has been shown as one single loop of an electric coil 30 which directs the induction field against the joint 14 and the strip 15 along the centre axis 33 thereof.

The sealing pressure belt 31 presses the edges of the web 26 together and presses the strip 29 against the web 26 which has been formed into tube-shape during the necessary time period after the welding device 30 has been passed, giving the weld seam the possibility of stabilization without any real mechanical strain.

In order to speed up the cooling and stabilization of the weld seam channels 34 for a cooling fluid are arranged in the mandrel 27.

For guiding the strip 29 there are arranged a longitudinal groove 35 in the mandrel. After the welding device 30 (seen in the machine direction) this groove may have a somewhat over-dimensioned width in order to allow flowing out of plastics onto the strip 29, such that the metal edges thereof are covered by the plastics. This shape of the recess 35 has been indicated by the broken lines 36.

In that case where an outside strip 19 is needed, a corresponding welding and sealing pressure device preferably is arranged after the devices 30, 31 in FIG. 5 (seen in the machine direction).

Such further arrangements have been denoted by the reference numeral 37 and an outer strip forming web 38 has also been indicated.

Figure 7:
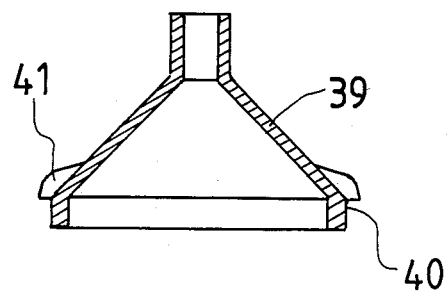

In FIG. 7 there is shown an all-metal tube breast 39 having a circumferential recess 40 forming a support surface for the tube body.

Figure 8:
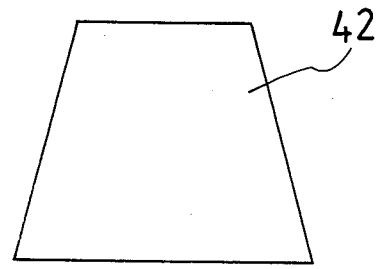

In that case where the tube body is formed as a stackable body, for instance from a trapezoid blank 42 as shown in FIG. 8, there is a nesting arrangement 41 formed as a circumferential shoulder for preventing adherence between individual tube bodies where such bodies are stacked, for instance in the storage of a filling machine.

Although specific embodiments of the invention have been described with reference to the specific examples given, it is realized that modifications and alternatives are possible within the scope of the accompanying claims.

For instance, the joint of the tube body, may be an overlap joint if required.

We claim:
1. A packaging tube, comprising:
 (a) a tubular body of a body laminate containing a metal foil and at least one layer of a plastics material superposed thereon, said tubular body having interior and exterior faces and defining a lengthwise direction;
 (b) a breast having a discharge opening secured to one end of said tubular body; and

(c) an elongated strip of a strip laminate attached to said tubular body and extending generally in said lengthwise direction along said tubular body, said strip laminate including a metal foil and at least one layer of a plastics material superposed thereon, said strip having two oppositely-directed faces, one face of said strip confronting a face of said body, said strip having dead-fold characteristics, the width of said strip being less than the circumference of said tubular body,
the thickness of the metal foil of the tubular body being within the interval 5 to 40 microns, the metal foil of the body being considerably thinner than the metal foil of the strip, the thickness of the metal foil of the strip being within the interval 40 to 200 microns.

2. A tube as in claim 1, wherein the metal foil of the body as well as the metal foil of the strip comprises aluminum foil.

3. A tube as in claim 1, wherein the body laminate is arranged edge against edge at said longitudinal joint, whereby said joint is a butt joint.

4. A tube as in claim 1, wherein said breast is an all-metal breast.

5. A tube as in claim 1, wherein said strip extends along the entire length of said body.

6. A tube as in claim 1, wherein the tubular body is conical.

7. A tube as in claim 6, wherein the tubular body is formed from a trapezoid blank.

8. A tube as in claim 1, wherein the tubular body has a longitudinal joint and the longitudinal joint is covered by said strip.

9. A tube as in claim 8, wherein the strip is arranged at the inside of the tubular body in alignment with said longitudinal joint so that a first face of said strip confronts said interior face of said body, said strip also extending circumferentially with respect to said tubular body so that said strip forms, on both sides of the longitudinal joint, barriers against penetration to the longitudinal joint of substances of the filling goods.

10. A tube as in claim 9, wherein said at least one plastics material layer of said strip laminate includes a first layer of plastics material on said first face of said strip and said at least one plastics material layer of said body laminate includes an interior layer of plastics material on said interior face of said body, said plastics materials in said first and said interior layers being sealed to one another.

11. A tube as in claim 10, wherein said strip includes plastics material covering the edges of said metal foil of said strip.

12. A tube as in claim 11, further comprising an outside strip arranged over the longitudinal joint on the exterior of said body.

13. A tube as in claim 12, wherein said body laminate includes an exterior layer of plastics material on said exterior face of said body, said outside strip having a plastics layer, the plastics layer of the outside strip being sealed to said exterior plastics layer of said body laminate.

14. A packaging tube, comprising:
(a) a tubular body of a body laminate containing a metal foil and at least one layer of a plastics material superposed thereon, said tubular body having interior and exterior faces and defining a lengthwise direction;
(b) a breast having a discharge opening secured to one end of said tubular body, and
(c) an elongated strip of a strip laminate attached to said tubular body and extending generally in said lengthwise direction along said tubular body, said strip laminate including a metal foil and at least one layer of a plastics material superposed thereon, said strip having two oppositely-directed faces, one face of said strip confronting a face of said body, said strip having dead-fold characteristics, the width of said strip being less than the circumference of said tubular body, the metal foil of the body being considerably thinner than the metal foil of the strip.

* * * * *